Figure 1:
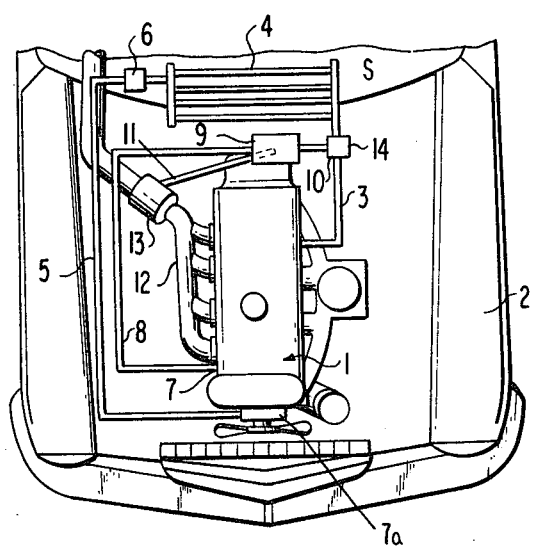

United States Patent [19]

Wulf et al.

[11] 4,087,047
[45] May 2, 1978

[54] HEATING UNIT FOR AUTOMOTIVE VEHICLES

[75] Inventors: Helmut Wulf, Ostfildern; Wolfgang Weidemann, Fellbach; Albert Stolz, Tubingen; Wolfgang Volz, Magstadt, all of Germany

[73] Assignee: Daimler-Benz Aktiengesellschaft, Germany

[21] Appl. No.: 689,965

[22] Filed: May 26, 1976

[30] Foreign Application Priority Data

May 28, 1975 Germany .............................. 2523645

[51] Int. Cl.² ............................................ B60H 1/02
[52] U.S. Cl. ........................ 237/12.3 B; 237/12.3 A; 165/105
[58] Field of Search ................. 237/12.3 R, 12.3 A, 237/12.3 B; 165/105

[56] References Cited

U.S. PATENT DOCUMENTS

| 2,749,050 | 6/1956 | Booth | 237/12.3 B |
| 3,211,374 | 10/1965 | Matulaitis | 237/12.3 B |
| 3,223,150 | 12/1965 | Tramontini | 237/12.3 B |
| 3,357,413 | 12/1967 | Quinton | 237/12.3 B |
| 3,498,539 | 3/1970 | Boehmfeld et al. | 237/12.3 B |
| 3,618,854 | 11/1971 | Frank | 165/105 |
| 3,986,665 | 10/1976 | Kofink et al. | 237/12.3 A |

*Primary Examiner*—John J. Camby
*Assistant Examiner*—Henry C. Yuen
*Attorney, Agent, or Firm*—Craig & Antonelli

[57] ABSTRACT

A heating system for motor vehicles with a heat-exchanger that is connected to the cooling system of the internal combustion engine; at least one heat conductor adapted to be acted upon by the exhaust system terminates in the flow path of the cooling water upstream of the heat-exchanger for the heating system.

11 Claims, 2 Drawing Figures

HEATING UNIT FOR AUTOMOTIVE VEHICLES

The present invention relates to a heating system for motor vehicles with a heat-exchanger which is connected to the cooling system of the internal combustion engine.

In internal combustion engines with small power outputs, for example, air-compressing injection internal combustion engines, the cooling water is heated up only very slowly with low outside temperatures. This leads with the known water heating systems to a slow start of the heating effect. In addition to this loss in comfort, there also exists an impairment of the driving safety owing to a lacking defrosting and dehumidification of the motor vehicle windowpanes.

The present invention is therefore concerned with the task to eliminate these disadvantages and to provide a motor vehicle heating system—with the continued use of the cooling water—in which a considerable improvement of the heating effect is attainable.

The underlying problems are solved according to the present invention in that at least one heat conductor adapted to be acted upon by the exhaust system terminates in the flow path of the cooling water upstream of the heat-exchanger for the vehicle heater.

In a preferred embodiment of the present invention, the heat conductor may be constructed as heat pipe which is provided at both ends with one heat-exchanger each, of which one heat-exchanger is connected with the exhaust system and the other with the cooling system.

Thus, the heat quantity contained in the exhaust gases of the internal combustion engine is utilized by the arrangement according to the present invention for the assist of the water-heating system of a motor vehicle. In addition to an increased heating effect, also a more rapid warm-up of the internal combustion engine is assured during cold start which will have an advantageous effect on the wear behavior.

In order to prevent the danger of overheating, for example, by a vapor-bubble-formation with a turned-off heater when the water in the heating system no longer flows in the hoses or lines, it is additionally proposed in motor vehicles with internal combustion engines which include a feed or inlet line leading from the cylinder head to the heat-exchanger for the heating system and a return line connecting this heat-exchanger with the crankcase of the internal combustion engine with interconnected main valve, that a connecting line connected to the crankcase branches off from the cooling system downstream of the water pump—as viewed in the flow direction—which leads by way of the heat-exchanger to the inlet line.

As a result of the existing pressure difference between the connections at the crankcase and at the cylinder head, a water flow will form will form by way of the heat-exchanger with a turned-off heater when the main valve is in the closing position, whereby the water flow is additionally assisted by the free convection of the water warmed-up in the heat-exchanger.

In order to assure that with a turned-off heater a transmission of slightest heat quantities does not take place in the heat-exchangers for the heating system, it is additionally provided according to the present invention that at a place where the connecting line terminates in the inlet line, a heat controller is arranged which is constructed as three-way valve.

Accordingly, it is an object of the present invention to provide a heater system for motor vehicles which avoids by simple means the aforementioned shortcomings and drawbacks encountered in the prior art.

Another object of the present invention resides in a heating system for motor vehicles with internal combustion engines, in which a considerable improvement of the heating effect is attainable with continued use of the cooling water in the heater, in order not only to improve the driving comfort but also the driving safety.

A further object of the present invention resides in a heating system for motor vehicles of the type described above in which the water heater commences to heat the vehicle and windows thereof at a relatively early stage during the warm-up of the engine.

A further object of the present invention resides in a heating system for motor vehicles which not only provides an increased heating action but is simple in construction, reliable in operation and effectively avoids overheating when the heater is turned off.

Figure 2:
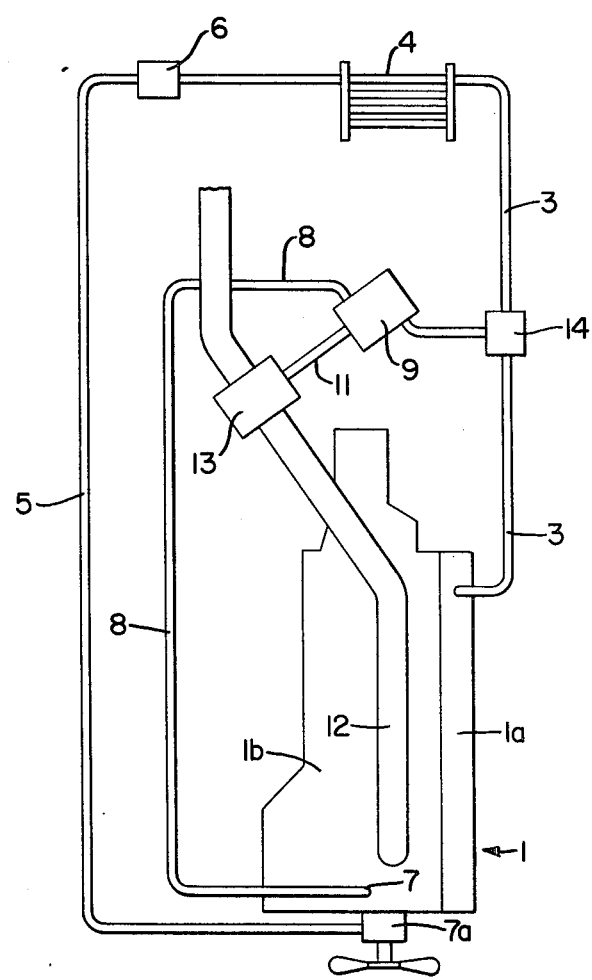

These and other objects, features and advantages of the present invention will become more apparent from the following description when taken in connection with the accompanying drawing which shows, for purposes of illustration only, one embodiment in accordance with the present invention, and wherein:

FIG. 1 is a schematic plan view on the front section of a motor vehicle illustrating the heating system in accordance with the present invention; and FIG. 2 is a schematic side view of the heating system of FIG. 1.

Referring now to the drawing, wherein like reference numerals are used in both views to designate like parts an inlet line 3 connected to the cooling circulatory system leads from the internal combustion engine generally designated by the reference numeral 1 of a passenger motor vehicle 2 to a heat-exchanger 4 serving to heat the passenger spaces and from there by way of a return line 5 with interconnected main valve 6 to the crankcase 1b of the internal combustion engine 1.

For purposes of assisting the cooling water heating system, a further line is provided, which branches off from the cooling circulatory system as connecting line 8 at a place 7 of the crankcase 1b downstream of a water pump 7a as viewed in the flow direction—and which terminates by way of a heat-exchanger 9 in the inlet line 3 shortly upstream of the heat-exchanger 4 for the heating system at a place 10.

The heat-exchanger 9 which gives off heat is operatively connected by way of a separate heating pipe 11 with a heat-absorbing heat-exchanger 13 connected with the exhaust elbow or manifold 12 of the internal combustion engine 1.

This heat pipe 11 which is able to transmit heat nearly effortlessly and losslessly to a remotely located body or to a medium consists of a hollow body of copper, stainless steel or heat-resistant glass which is coated internally with a capillary layer. Both ends of the heat pipe 11 are closed off air-tight whereby a slight quantity of a liquid in a partial vacuum is present on the inside space.

OPERATION

The operation of the motor vehicle cooling water heating system of the present invention is as follows:

The heat-exchanger 4 for heating the passenger space is supplied in the usual manner by way of the inlet line 3 with water from the cooling circulation. Since the cooling water at low outside temperature warms up only very slowly and thus does not assure a sufficient defrosting and dehumidification of the motor vehicle windowpanes, heat for heating purposes is removed from the exhaust system at the manifold 12 and supplied by way of the heat-exchanger 13 to the heating pipe 11, whose slight quantity of a fluid in the interior space under low pressure immediately begins to boil and the molecules move through the hollow body at high velocity. They impinge on the other side against the wall, deposit thereat and thereby give off their latent heat by way of the heat-exchanger 9 thereat to the cooling water flowing in the connecting line 8 past the heat exchanger 9. The return of the molecules to the starting point takes place by way of the capillary layer. The molecules move in the heat pipe 11 with high velocity up to the order of magnitude of the sound velocity which explains the extremely high heat conduction and consequently also the nearly lossless heat transmission.

By reason of the pressure difference existing between the connections at the crankcase 1b and at the cylinder head 1a, a water flow will form also with a turned-off heater, i.e., when the main valve 6 is closed. This water flow is additionally assisted by the free convection of the water warmed-up in the heat-exchanger 9 which finally flows back by way of the inlet line into the cooling circulation of the internal combustion engine.

A heater controller 14 constructed as three-way valve may be provided at the place 10, which with a turned-off heater precludes a transmission of smallest heat quantities.

Therebeyond, a control of the transmitted heat quantity may possibly be realized by a transmission slide valve arranged between the heat-absorbing heat-exchanger 13 and the heat pipe 11 or by way of the changeable transmission liquid changeable in the heat-exchanger.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A heating system for motor vehicles with an internal combustion engine having a cooling system, comprising a heater heat-exchanger means operatively connected with the cooling system, an inlet line leading from the internal combustion engine at a cylinder head thereof to the heater heat-exchanger means, and a return line connecting the heater heat-exchanger means with the internal combustion engine at a crankcase thereof, said return line leading to a water pump, characterized in that at least one heat conductor means operable to be acted upon by and connected to the exhaust system of the internal combustion engine is provided, said heat conductor means terminates in a flow path of a coolant of the cooling system upstream of the heater heat-exchanger means, a heat-exchanger is provided on at least one end of the heat conductor means, and in that a connecting line is arranged at the crankcase downstream of the water pump as viewed in the flow direction of the coolant, said connecting line extending from the crankcase through the heat-exchanger provided on the heat conductor means and terminating in the inlet line upstream of the heater heat-exchanger means.

2. A heating system according to claim 1, characterized in that a heater control means is provided at a place where the connecting line terminates in the inlet line.

3. A heating system according to claim 2, characterized in that the heater control means is constructed as three-way valve.

4. A heating system for motor vehicles with an internal combustion engine having a liquid cooling system, the heating system including a heat-exchanger means for heating a passenger space of the motor vehicle, an inlet line means leading from a cylinder head of the internal combustion engine to the passenger space heat-exchanger means for supplying a flow of coolant liquid to the passenger space heat-exchanger means, a return line means for directing a return flow of the coolant liquid from the passenger space heat-exchanger means to the internal combustion engine, characterized in that a heat conductor means is provided for assisting in a heating of the coolant liquid, a first heat-exchanger is operatively connected with a first end of said heat conductor means, a second heat-exchanger is connected with a second end of said heat conductor means, and a connection line means is arranged between the inlet line means and a crankcase of the internal combustion engine for directing a flow of coolant liquid from the inlet line means to the crankcase, said connection line means communicating with the inlet line means at a position upstream of the passenger space heat-exchanger means, as viewed in a flow direction of the coolant liquid, and extending through one of said first and second heat-exchangers and terminating in the crankcase at a position downstream of a water pump of the internal combustion engine, as viewed in the flow direction, and means are provided at the inlet line means for controlling the flow of coolant liquid to the passenger space heat-exchanger means and said connection line means.

5. A heating system according to claim 4, characterized in that the internal combustion engine includes an exhaust manifold, and in that one of said first and second heat-exchangers is operatively connected with the exhaust manifold and the other of said first and second heat-exchangers is operatively connected with the cooling system of the internal combustion engine.

6. A heating system according to claim 5, characterized in that the connection line means extends through the second heat-exchanger operatively connected with the cooling system of the internal combustion engine.

7. A heating system according to claim 6, characterized in that said controlling means is a three-way valve arranged in the inlet line means at a position thereof where the connection line means communicates therewith.

8. A heating system according to claim 7, characterized in that a main control valve means is arranged in the return line means for controlling the return flow of coolant liquid from the passenger space heat-exchanger means to the internal combustion engine.

9. A heating system for motor vehicles with an internal combustion engine having a cooling system, a heater heat-exchanger means operatively connected with the cooling system, an inlet line leading from a cylinder head of the internal combustion engine to the heater heat-exchanger means, a return line means for connecting the heater heat-exchanger means with the internal combustion engine at a crankcase thereof, and a main valve for controlling a flow of coolant from the heater heat-exchanger means through the return line means to a water pump, characterized in that at least one heat conductor means operable to be acted upon by and connected to an exhaust system of the internal combustion engine is provided, said heat conductor means terminates in a flow path of a coolant of the cooling system, the heat conductor means is constructed as a heat pipe provided at both ends with a separate heat-exchanger, one of the heat-exchangers is operatively connected with an exhaust system of the internal combustion engine and the other of the heat-exchangers is operatively connected with the cooling system at a position upstream of the heater heat-exchanger means as viewed in a flow direction of the coolant, a connecting line is arranged at a crankcase of the internal combustion engine downstream of a water pump as viewed in a flow direction of the coolant, said connecting line extending from the crankcase through the heat-exchanger connected with the cooling system and terminating in the inlet line upstream of the heater heat-exchanger means.

10. A heating system according to claim 9, characterized in that a heater control means is provided at the termination of the connecting line in the inlet line.

11. A heating system according to claim 5, characterized in that the heater control means is constructed as three-way valve.

* * * * *